(12) United States Patent
Wang et al.

(10) Patent No.: US 12,216,204 B2
(45) Date of Patent: Feb. 4, 2025

(54) METHOD AND DEVICE FOR MEASURING DISTANCE, AND STORAGE MEDIUM

(71) Applicant: BEIJING XIAOMI MOBILE SOFTWARE CO., LTD., Beijing (CN)

(72) Inventors: Kai Wang, Beijing (CN); Runyu Shi, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 327 days.

(21) Appl. No.: 17/683,175

(22) Filed: Feb. 28, 2022

(65) Prior Publication Data

US 2023/0045608 A1    Feb. 9, 2023

(30) Foreign Application Priority Data

Aug. 6, 2021    (CN) .......................... 202110901570.8

(51) Int. Cl.
*G01S 15/74* (2006.01)
*G01S 13/74* (2006.01)
*G01S 17/74* (2006.01)

(52) U.S. Cl.
CPC .............. *G01S 15/74* (2013.01); *G01S 13/74* (2013.01); *G01S 17/74* (2013.01)

(58) Field of Classification Search
CPC .......... G01S 15/74; G01S 13/74; G01S 17/74; G01S 15/104; G01S 15/10
See application file for complete search history.

(56) References Cited

U.S. PATENT DOCUMENTS

| | | | |
|---|---|---|---|
| 10,141,973 B1* | 11/2018 | Ramalho | H04B 1/707 |
| 2008/0304361 A1 | 12/2008 | Peng et al. | |
| 2017/0078036 A1* | 3/2017 | Lee | A61B 5/02125 |
| 2018/0267154 A1* | 9/2018 | Ootaka | G01S 7/4912 |
| 2019/0025402 A1* | 1/2019 | Qu | G01S 11/14 |

(Continued)

FOREIGN PATENT DOCUMENTS

| | | |
|---|---|---|
| CN | 111751786 A | 10/2020 |
| CN | 112904324 A | 6/2021 |
| WO | 2019056760 A1 | 3/2019 |

OTHER PUBLICATIONS

C. Ling Huang, Yilong Lu and W. Liu, "Using chirp signal for accurate RFID positioning," 2010 International Conference on Communications, Circuits and Systems (ICCCAS), Chengdu, China, 2010, pp. 675-679, (Year: 2010).*

(Continued)

*Primary Examiner* — David M Schindler
*Assistant Examiner* — Dilara Sultana
(74) *Attorney, Agent, or Firm* — Arch & Lake LLP (57) ABSTRACT

The present disclosure is related to a method and device for measuring a distance and a storage medium. The method for measuring the distance includes determining a distance between a first device and a second device based on a first time difference and a second time difference, where the first time difference is between a time of receiving a first detection signal by the first device and a time of receiving a second detection signal by the first device, and the second time difference is between a time of receiving the first detection signal by the second device and time of receiving the second detection signal by the second device.

20 Claims, 6 Drawing Sheets

(56) References Cited

U.S. PATENT DOCUMENTS

2019/0033438 A1* 1/2019 Tu .......................... G01S 1/751
2020/0292659 A1* 9/2020 Bai ....................... G01S 13/931

OTHER PUBLICATIONS

He Chu Bu Jiang Nan, "What are the advantages and disadvantages of infrared ranging and ultrasonic ranging?" https://www.zhihu.com/question/28749424, (8p).
Sun, De-hui et al., "Spread Spectrum Communication Research Based on PSK Modulation", Journal of Liaoning University of Technology (Natural Science Edition), vol. 30, No. 5, Oct. 2010, (5p).
Feng, Xiaoping et al., "Study of The Method of Discrete Stft Demodulation for The Fsk Signal", Journal of Xidian University, vol. 28, No. 6, Dec. 2001, (5p).
Li, Gang, "OFDM Modulation Technique And The Implementation And Realization in WLAN", Zhejiang University of Technology, Apr. 2008, (84p).
Extended European Search Report issued in Application No. 22162763.1 dated Aug. 9, 2022, (12p).
Zengbin Zhang et al., "SwordFight: Enabling a New Class of Phone-to-Phone Action Games on Commodity Phones", (14p).

* cited by examiner

METHOD AND DEVICE FOR MEASURING DISTANCE, AND STORAGE MEDIUM

CROSS-REFERENCE TO RELATED APPLICATION

This application is based on and claims the benefit of priority to Chinese Application No. 202110901570.8, filed on Aug. 6, 2021, the contents of which are incorporated herein by reference in their entireties for all purposes.

TECHNICAL FIELD

The present disclosure relates to the field of distance measurement technology, and in particular to a method and device for measuring a distance, and a storage medium.

BACKGROUND

As technology advances, many technologies depend on the distance between two devices, such as target detection, the use of smart devices to perform specified tasks, and unmanned vehicles. There are many ways to measure the distance between devices based on the Time Of Flight (TOF) of the signal in related art, such as infrared ranging or infrared distance measurement, electromagnetic wave ranging or electromagnetic wave distance measurement, or ultrasonic ranging or ultrasonic distance measurement. In the distance measurement process, accurately determining the TOF of the signal between the devices plays a key role in determining the distance between devices.

SUMMARY

The present disclosure provides a method and device for measuring a distance and a storage medium.

According to a first aspect of embodiments of the present disclosure, there is provided a method for measuring a distance, applied to a first device, including: sending a first detection signal; determining a time difference, between a time of receiving the first detection signal by the first device and a time of receiving a second detection signal by the first device, as a first time difference, where the second detection signal is sent by a second device in response to the second device receiving the first detection signal; obtaining a second time difference from the second device, the second time difference being a time difference between a time of receiving the first detection signal by the second device and a time of receiving the second detection signal by the second device; and determining the distance between the first device and the second device based on the first time difference and the second time difference.

According to a second aspect of embodiments of the present disclosure, there is provided a device for measuring a distance, including: a processor, and a memory storing one or more executable instructions for the processor, where the processor is configured to perform the method for measuring the distance as described in the first aspect.

According to a third aspect of embodiments of the present disclosure, there is provided a non-transitory computer readable storage medium that, when instructions in the storage medium are executed by a processor of a mobile terminal, enables the mobile terminal to perform the method for measuring the distance described in the first aspect.

It should be understood that the foregoing general description and the following detailed descriptions are exemplary and explanatory only and do not limit the present disclosure.

BRIEF DESCRIPTION OF THE DRAWINGS

The accompanying drawings, which are incorporated herein into and form a part of the specification, illustrate embodiments consistent with the present disclosure and are used in conjunction with the specification to explain the principles of the present disclosure.

DETAILED DESCRIPTION

Embodiments will be described herein in detail, examples of which are illustrated in the accompanying drawings. When the following description relates to the drawings, the same numerals in different drawings represent the same or similar elements unless otherwise indicated. The implementations described in the following embodiments do not represent all implementations that are consistent with the present disclosure; rather, they are only examples of devices and methods that are consistent with some aspects of the present disclosure, as detailed in the appended claims.

Figure 1:
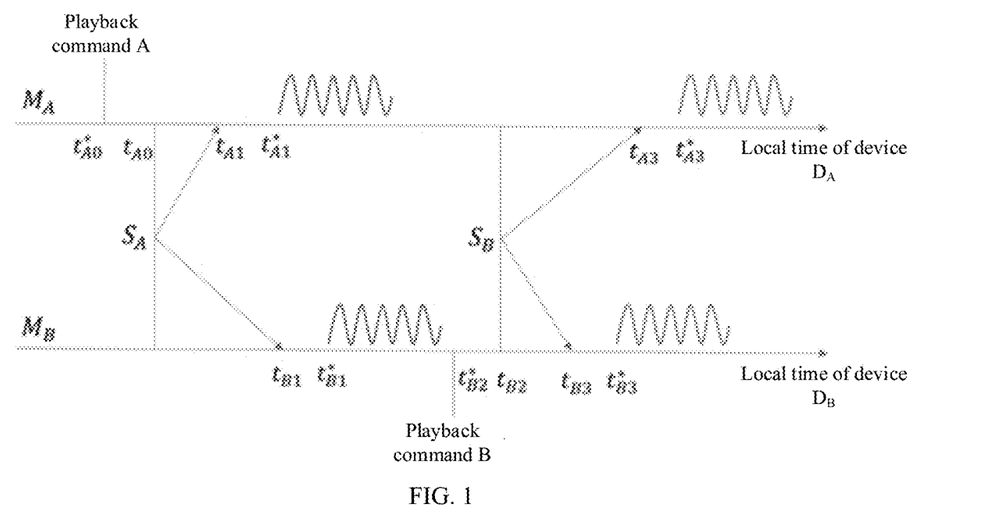
FIG. 1 is a schematic diagram of signal transmission for distance measurement between two devices illustrated according to an embodiment.

FIG. 1 is a timing diagram of a distance measurement process. According to FIG. 1, the causes of inaccurate distance measurement in the related art are analyzed. In FIG. 1, $M_A$ represents the time axis of device $D_A$ corresponding to local time, $M_B$ represents the time axis of device $D_B$ corresponding to local time, $t^*_{A0}$ represents the time when device $D_A$ indicates the signal transmitter to send a detection signal A, $t_{A0}$ represents the time when the signal transmitter of device $D_A$ actually sends detection signal A, $t_{A1}$ represents the time when detection signal A arrives at the signal receiver of device $D_A$, $t^*_{A1}$ represents the time when detection signal A is actually received by the signal receiver of device $D_A$, $t_{B1}$ represents the time when detection signal A arrives at the signal receiver of device $D_B$, $t^*_{B1}$ represents the time when detection signal A is actually received by the signal receiver of device $D_B$, $t^*_{B2}$ represents the time when device $D_B$ indicates the signal transmitter to send detection signal B, $t_{B2}$ represents the time when the signal transmitter of device $D_B$ actually sends detection signal B, $t_{B3}$ represents the time when detection signal B arrives at the signal receiver of device $D_B$, $t^*_{B3}$ represents the time when detection signal B is actually received by the signal receiver of device $D_B$, $t_{A3}$ represents the time when detection signal B arrives at the signal receiver of device $D_A$, and $t^*_{A3}$ represents the time when detection signal B is actually received by the signal receiver of device $D_A$.

When TOF-based distance measurement is performed in related art, the time difference $T_f$ between the time $t^*_{A0}$ when device $D_A$ indicates the signal transmitter to send detection signal A and the time $t^*_{A3}$ when detection signal B is actually received by the signal receiver of device $D_A$, and the time difference $T_f$ between the time $t^*_{B2}$ when device $D_B$ indicates the signal transmitter to send detection signal B and the time $t^*_{B1}$ when detection signal A is actually received by the signal receiver of device $D_B$, are determined, the TOF of detection signal between device $D_A$ and device $D_B$ is determined according to $(T_f - T_r)/2$, and then the distance between device $D_A$ and device $D_B$ is determined. As can be seen from FIG. 1, the time $t^*_{A0}$ when device $D_A$ indicates the signal transmitter to send detection signal A, and the time to when the signal transmitter of device $D_A$ actually sends detection signal A are not equal, and the time $t_{B1}$ when detection signal A arrives at the signal receiver of device $D_B$ and the time $t^*_{B1}$ when detection signal A is actually received by the signal receiver of device $D_B$ are not equal. That is, due to the difference in resources within the device, there is a time difference between the device issuing the instruction and the actual execution of the instruction by the device. The time difference caused by sufficient resources in some devices is almost negligible, but the time difference caused by insufficient resources in some devices is as large as tens of milliseconds, or even seconds, which cannot be ignored. However, the time difference that cannot be ignored is ignored in the related art, resulting in an inaccurate final distance between device $D_A$ and device $D_B$, while the realization of the technology in certain scenarios depends on the accuracy of the distance between devices, such as the realization of unmanned driving technology.

Accordingly, the present disclosure provides a method for measuring a distance measurement. In this method, a first device sends a first detection signal; a first time difference, between a time when the first device receives the first detection signal and a time when the first device receives a second detection signal, is determined; a second time difference, between a time when a second device receives the first detection signal and a time when the second device receives the second detection signal, is obtained; and a distance between the first device and the second device is determined based on the first time difference and the second time difference, avoiding inaccurate determination of the distance between the first device and the second device due to errors in the calculation of the time difference caused by the computing resources of the first device and/or the second device. In order to clarify the difference of the method for measuring the distance in this embodiment from the related art, the first device is represented as device $D_A$, the first detection signal is represented as detection signal A, the second device is represented as device $D_B$, and the second detection signal is represented as detection signal B. In FIG. 1, the first time difference is the time difference between the time $t_{A3}$ when detection signal B arrives at the signal receiver of device $D_A$ and the time $t_{A1}$ when detection signal A arrives at the signal receiver of device $D_A$, and the second time difference is the time difference between the time $t_{B3}$ when detection signal B arrives at the signal receiver of device $D_B$ and the time $t_{B1}$ when detection signal A arrives at the signal receiver of device $D_B$. Thus, compared with the related art, the accuracy of the flight time is improved, and the accuracy of the distance between the first device and the second device is further improved.

Figure 2:
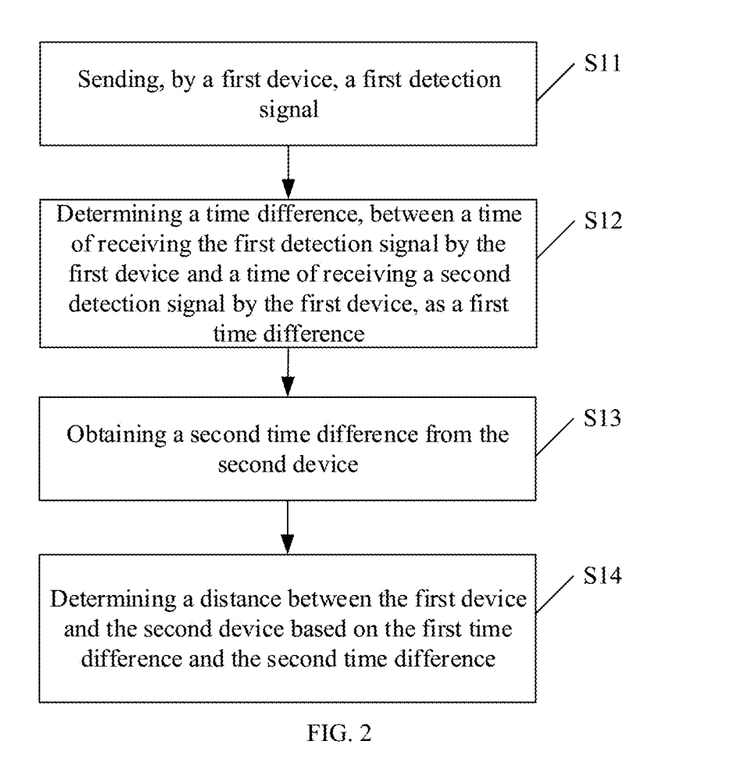
FIG. 2 is a flow chart of a method for measuring a distance illustrated according to an embodiment.

FIG. 2 is a flow chart of a method for measuring a distance illustrated according to an embodiment. This embodiment illustrates the method for measuring the distance as an example of the method applied to a first device, as shown in FIG. 2, which includes the following steps.

At step S11, the first device sends a first detection signal.

In this embodiment of the present disclosure, the first detection signal may be a detection signal generated by the first device in real time, or may be a detection signal stored in the first device in advance, or may be a detection signal sent by other devices to the first device. The first detection signal is used as an agreed signal when distance measurement is performed between the first device and the second device, and when the second device receives the first detection signal, it sends an answer signal corresponding to the first detection signal to the first device, as compared to the first device sending the first detection signal and receiving the first detection signal back from the second device, increasing the uniqueness between distance measurement targets as well as reducing the signal in a round-trip transmission loss.

At step S12, a time difference, between a time of receiving the first detection signal by the first device and a time of receiving a second detection signal by the first device, is determined as the first time difference.

In this step, the first time difference is the time difference between the time when the first device receives the first detection signal and the time when the first device receives the second detection signal. The second detection signal is sent by the second device in response to the second device receiving the first detection signal. In contrast, the time difference, in the related art, is between the time when the first device sends the first detection signal and the time when the first device receives the second detection signal. Therefore, this step of the present disclosure increases the accuracy of the first time difference by considering the effect of the time difference on the flight time between the time of issuing the instruction to send the first detection signal and the time of actually sending the first detection signal due to the resources in the first device.

At step S13, a second time difference sent by the second device is obtained.

In this step, the obtained second time difference is the time difference between the time when the second device receives the first detection signal and the time when the second device receives the second detection signal. In contrast, the time difference, in the related art, is between the time when the second device sends the second detection signal and the time when the second devices receives the first detection signal. Therefore, this step of the present disclosure increases the accuracy of the second time difference by avoiding the effect of the time difference on the time of flight between the time of issuing the instruction to send the second detection signal and the time of actually sending the second detection signal due to the resources in the second device.

In this embodiment, the first device may obtain the time when the second device receives the first detection signal, and the time when the second device receives the second detection signal, and obtain the second time difference within the first device calculated from the time difference between the time when the second device receives the first detection signal and the time when the second device receives the second detection signal. In this embodiment, it is not limited on which device the calculation of the second time difference is performed. The second time difference can be calculated in the first device, or calculated in the second device, or calculated in other devices and sent to the first device.

At step S14, the distance between the first device and the second device is determined based on the first time difference and the second time difference.

In this embodiment, the time of flight of the detection signal between the first device and the second device is determined based on half of the absolute value of the difference between the first time difference and the second time difference, and the distance between the first device and the second device is obtained based on the product of the time of flight and the speed of propagation of the detection signal in the medium in which the first device and the second device are located.

In one embodiment, the method for measuring the distance in this embodiment is illustrated using acoustic-based distance measurement as an example. The first device is represented as device $D_A$, the second device is represented as device $D_B$, and both device $D_A$ and device $D_B$ include a speaker and a microphone. The first detection signal is characterized by ultrasonic signal A, and the second detection signal is characterized by ultrasonic signal B. In the timing diagram shown in FIG. 1, $t^*_{A0}$ represents the time when device $D_A$ indicates the speaker to emit the ultrasonic signal A, $t_{A0}$ represents the time when the speaker of device $D_A$ actually emits the ultrasonic signal A, $t_{A1}$ represents the time when the ultrasonic signal A arrives at the microphone of device $D_A$, $t^*_{A1}$ represents the time when the microphone of device $D_A$ actually receives the ultrasonic signal A, $t_{B1}$ represents the time when the ultrasonic signal A arrives at the microphone of device $D_B$, $t^*_{B1}$ represents the time when the microphone of device $D_B$ actually receives the ultrasonic signal A, $t^*_{B2}$ represents the time when device $D_B$ indicates the speaker to emit the ultrasonic signal B, $t_{B2}$ represents the time when the speaker of device $D_B$ actually emits the ultrasonic signal B, $t_{B3}$ represents the time when the ultrasonic signal B arrives at the microphone of device $D_B$, $t^*_{B3}$ represents the time when the microphone of device $D_B$ actually receives the ultrasonic signal B, $t_{A3}$ represents the time when the ultrasonic signal B arrives at the microphone of device $D_A$, and $t^*_{A3}$ represents the time when the microphone of device $D_A$ actually receives the ultrasonic signal B. By defining $d_{x,y}$ as the distance between the speaker of device x and the microphone of device y, the following formulas are obtained.

$d_{A,A} = u \cdot (t_{A1} - t_{A0})$, where $d_{A,A}$ represents the distance between the speaker and the microphone of device $D_A$, and u represents the speed of sound of the ultrasonic signal in air.

$d_{A,B} = u \cdot (t_{B1} - t_{A0})$, where $d_{A,B}$ represents the distance between the speaker of device $D_A$ and the microphone of device $D_B$.

$d_{B,B} = u \cdot (t_{B3} - t_{B2})$, where $d_{B,B}$ represents the distance between the speaker and the microphone of device $D_B$.

$d_{B,A} = u \cdot (t_{A3} - t_{B2})$, where $d_{B,A}$ represents the distance between the speaker of device $D_B$ and the microphone of device $D_A$.

In this embodiment, the distance d between device $D_A$ and device $D_B$ can be approximated by the following formulas.

$$d = \frac{1}{2} \cdot (d_{A,B} + d_{B,A}) \quad (1)$$

$$= \frac{u}{2} \cdot (t_{B1} - t_{B2} + t_{B3} - t_{B3} + t_{A3} - t_{A0} + t_{A1} - t_{A1}) \quad (2)$$

$$= \frac{u}{2} \cdot ((t_{A3} - t_{A1}) - (t_{B3} - t_{B1}) + (t_{B3} - t_{B2}) + (t_{A1} - t_{A0})) \quad (3)$$

$$= \frac{u}{2} \cdot ((t_{A3} - t_{A1}) - (t_{B3} - t_{B1})) + d_{B,B} + d_{A,A} \quad (4)$$

$$= \frac{u}{2} \cdot ((t^*_{A3} - t^*_{A1}) - (t^*_{B3} - t^*_{B1})) + d_{B,B} + d_{A,A} \quad (5)$$

In formula (1), distance d between device $D_A$ and device $D_B$ is obtained by half of the sum of distance $d_{A,B}$ between the speaker of device $D_A$ and the microphone of device $D_B$ and distance $d_{B,A}$ between the speaker of device $D_B$ and the microphone of device $D_A$. Formula (2) is obtained by plugging the formulas $d_{A,B} = u/2 \cdot (t_{B1} - t_{B2})$ and $d_{B,A} = u/2 \cdot (t_{A3} - t_{A0})$ into formula (1), and further adding $t_{B3}$ and $t_{A1}$ and subtracting $t_{B3}$ and $t_{A1}$ for the purpose of derivation, which does not have a substantial effect on the result of the formula. Formula (3) is obtained by adjusting formula (2), and then formula (4) is obtained based on the formulas $d_{A,A} = u \cdot (t_{A1} - t_{A0})$ and $d_{B,B} = u \cdot (t_{B3} - t_{B2})$. As shown in FIG. 1, the difference between $t_{A3}$ and $t_{A1}$ (i.e., $t_{A3} - t_{A1}$) is equal with the difference between $t^*_{A3}$ and $t^*_{A1}$ (i.e., $t^*_{A3} - t^*_{A1}$), and the difference between $t_{B3}$ and $t_{B1}$ (i.e., $t_{B3} - t_{B1}$) is equal with the difference $t^*_{B3}$ and $t^*_{B1}$ (i.e., $t^*_{B3} - t^*_{B1}$). Thus, the final formula (5) used to calculate the distance d between device $D_A$ and device $D_B$ is obtained.

When using formula (5) to calculate the distance d between device $D_A$ and device $D_B$, the sum of $d_{B,B}$ and $d_{A,A}$, i.e., $d_{B,B} + d_{A,A}$, is approximated as 0 because of the very close distance between the signal transmitter and signal receiver of some devices, so the distance d between device $D_A$ and device $D_B$ is calculated according to the following formula.

$$d = \frac{u}{2} \cdot ((t^*_{A3} - t^*_{A1}) - (t^*_{B3} - t^*_{B1})).$$

When the actual calculation is performed, the first time difference obtained by the formula $t^*_{A3} - t^*_{A1}$, is characterized by the ratio between the first sampling time difference and the first sampling frequency, and the first sampling time difference is the difference between the first sampling time and the second sampling time. The second time difference obtained by the formula $t^*_{B3} - t^*_{B1}$, is characterized by the ratio between the second sampling time difference and the second sampling frequency, and the second sampling time difference is the difference between the third sampling time and the fourth sampling time. The first sampling time is a sampling time when the first device samples the first detection signal using the first sampling frequency, and the second sampling time is a sampling time when the first device samples the second detection signal using the first sampling frequency. The third sampling time is a sampling time when the second device samples the first detection signal using the second sampling frequency, and the fourth sampling time is a sampling time when the second device samples the second detection signal using the second sampling frequency.

Continuing with the example of device $D_A$ and device $D_B$ in the above embodiment, the first time difference is converted by the sampling rate and the difference between the sampling time, as reflected in the following formula.

$t^*_{A3} - t^*_{A1} = (n_{A3} - N_{A1})/f_{1s}$, where $n_{A3}$ represents the sample point time when device $D_A$ records detection signal B at the first sample frequency, and $n_{A1}$ represents the sampling point time when device $D_A$ records detection signal A at the first sampling frequency, and $f_{1s}$ represents the first sampling frequency.

Similarly, the second time difference is converted by the sampling rate and the difference between the sampling time, as reflected in the following formula.

$t^*_{B3} - t^*_{B1} = (n_{B3} - n_{B1})/f_{2s}$, where $n_{B3}$ represents the sample point time when device $D_B$ records detection signal B at the second sample frequency, and $n_{B1}$ represents the sampling point time when device $D_B$ records detection signal A at the second sampling frequency, and $f_{2s}$ represents the second sampling frequency. The first sampling frequency may be equal to the second sampling frequency.

Figure 3:
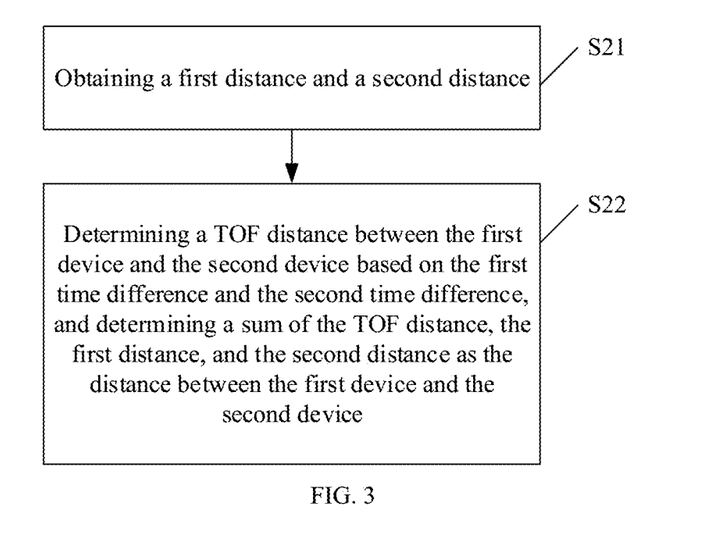
FIG. 3 is a flow chart of a method for measuring a distance illustrated according to an embodiment.

FIG. 3 is a flow chart of a method for measuring a distance illustrated according to an embodiment. As shown in FIG. 3, the method for measuring the distance includes the following steps.

At step S21, a first distance and a second distance are obtained.

In this step, the first distance is a distance between the signal transmitter and the signal receiver of the first device, and the second distance is a distance between the signal transmitter and the signal receiver of the second device. In the design of some first devices or second devices, the signal transmitter and signal receiver are set far apart for performance reasons, for example, in order to avoid the interference of the acoustic receiver on the acoustic emission signal, the acoustic transmitter and acoustic receiver are arranged at different locations separated by a certain distance.

At step S22, a Time Of Flight (TOF) distance between the first device and the second device is determined based on the first time difference and the second time difference, and a sum of the TOF distance, the first distance, and the second distance, is determined as the distance between the first device and the second device.

In this embodiment, in order to accurately measure the distance between the first device and the second device, the distance between the signal transmitter and the signal receiver of the first device and the second distance between the signal transmitter and the signal receiver of the second device are considered. The first device is represented as device $D_A$, the first detection signal is represented as detection signal A, the second device is represented as device $D_B$, and the second detection signal is represented as detection signal B. The distance d between device $D_A$ and device $D_B$ is calculated according to the following formula.

$$d = \frac{u}{2} \cdot ((t^*_{A3} - t^*_{A1}) - (t^*_{B3} - t^*_{B1})) + d_{B,B} + d_{A,A}.$$

The above formula, used to calculate the distance d between device $D_A$ and device $D_B$, ensures the accuracy of the distance measurement result.

Figure 4:
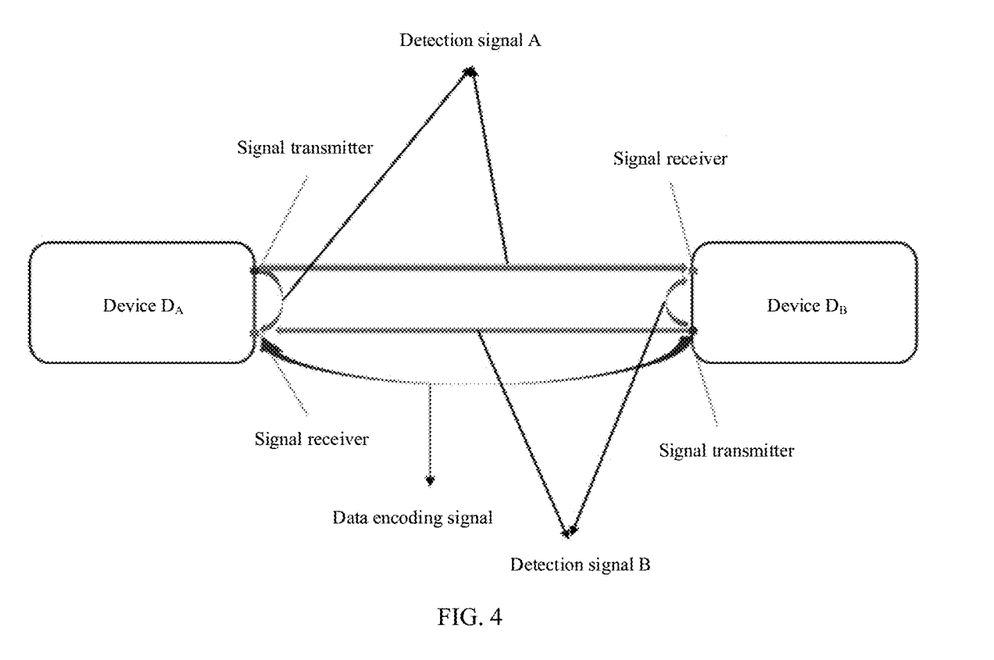
FIG. 4 is a schematic diagram of a distance measurement process illustrated according to an embodiment.

Further, in order to more clearly illustrate the method for measuring the distance in the embodiments of the present disclosure, the two devices to be measured are represented as device $D_A$ and device $D_B$. Device $D_A$ is equipped with a signal transmitter and a signal receiver, and device $D_B$ is equipped with a signal transmitter and a signal receiver. As can be seen from FIG. 4, the distance between device $D_A$ and device $D_B$ is measured by sending and receiving detection signals from device $D_A$ and device $D_B$ to each other and by measuring the time of flight of the detection signals in the medium. The distance measurement process between device $D_A$ and device $D_B$ is illustrated in FIG. 4 with device $D_A$ and device $D_B$ as examples. The signal transmitter of device $D_A$ sends detection signal A, and the signal transmitter of device $D_B$ sends detection signal B. The signal receiver of device $D_B$ not only receives detection signal A and records the time when detection signal A is received, but also receives detection signal B and records the time when detection signal B is received. The difference, between the time when device $D_B$ receives detection signal B and the time when device $D_B$ receives detection signal A, is recorded as time difference t1. The signal receiver of device $D_A$ receives detection signal B and records the time when detection signal B is received, and also receives detection signal A and records the time when detection signal A is received. The difference, between the time when device $D_A$ receives detection signal A and the time when device $D_A$ receives detection signal B, is recorded as time difference t2. Half of the absolute value of the difference between time difference t1 and time difference t2 is taken as a time of flight of detection signal A or detection signal B between device $D_A$ and device $D_B$, and then the distance between device $D_A$ and device $D_B$ is determined based on the time of flight and the propagation speed of the detection signal in the medium.

In this embodiment, the distance between device $D_A$ and device $D_B$ may be calculated in device $D_A$, or may be calculated in device $D_B$, or may be calculated in other devices that have the calculation function other than device $D_A$ and device $D_B$. As shown in FIG. 4, taking the calculation of the distance between two devices performed at device $D_A$ as an example, when calculating the distance between two devices on device $D_A$, device $D_B$ encodes time difference t1 to generate a data encoding signal and send it to device $D_A$ through the signal transmitter of device $D_B$. Device $D_A$ decodes the received data encoding signal to obtain time difference t1, obtains the time of flight of the detection signal based on time difference t1 and time difference t2, and determines the distance between device $D_A$ and device $D_B$ based on the time of flight. In other embodiments, when calculating the distance between device $D_A$ and device $D_B$ on other devices having a calculation function other than device $D_A$ and device $D_B$, device $D_A$ may encode time difference t2 to generate a data encoding signal, and send the data encoding signal and another data encoding signal generated by device $D_B$ encoding time difference t1 to the other devices. The other devices are used to calculate the distance between device $D_A$ and device $D_B$.

Figure 5:
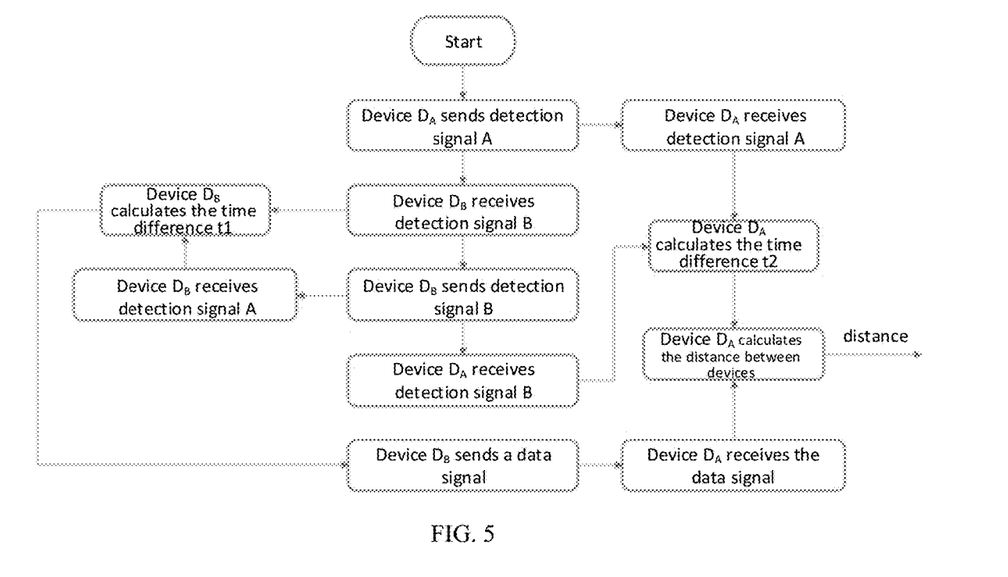
FIG. 5 is a schematic diagram of a distance measurement process illustrated according to an embodiment.

FIG. 5 is a schematic diagram of a distance measurement process illustrated according to an embodiment. This embodiment illustrates the method for measuring the distance in accordance with the distance measurement process shown in FIG. 2. After the distance measurement function is turned on in device $D_A$, device $D_A$ sends detection signal A, which is respectively received by the signal receiver of device $D_A$ and the signal receiver of device $D_B$ after propagation through the medium, and records the moment when detection signal A is received by the signal receiver of device $D_A$ as $t_{AA}$. Device $D_B$ records the moment when detection signal A is received by the signal receiver of device $D_B$ as $t_{AB}$. When the signal receiver of device $D_B$ receives and detects detection signal A, device $D_B$ immediately sends detection signal B, which is respectively received by the signal receiver of device $D_A$ and the signal receiver of device $D_B$ after propagation through the medium, and records the moment when detection signal $D_B$ is received by the signal receiver of device $D_B$ as $t_{BB}$. Device $D_A$ records the moment when detection signal B is received by the signal receiver of device $D_A$ as $t_{BA}$. Time difference t1 is calculated by t1=$t_{BB}$-$t_{AB}$ in device $D_B$, and time difference t2 is calculated by t2=$t_{BA}$-$t_{AA}$ in device $D_A$. After time difference t1 is calculated in device $D_B$, the time difference t1 is encoded and modulated to generate a data encoding signal, so that the data encoding signal carries encoding information, and the data encoding signal is sent from the signal transmitter of device $D_B$ to device $D_A$. The signal receiver of device $D_A$ receives the data encoding signal and decodes it to obtain the time difference t1, and then device $D_A$ calculates the distance d between device $D_A$ and device $D_B$ according to d=u*(t2−t1)/2+D, where D represents the sum of the distance between the signal transmitter and signal receiver of device $D_A$ and the distance between the signal transmitter and signal receiver of device $D_B$, and u represents the speed of propagation of the detection signal in the medium.

Taking the example of device $D_A$ and device $D_B$ measuring distance through acoustic waves, u represents the speed of the detection signal propagating through the air, approximated as 340 m/s. More precisely, the speed of sound at different temperatures may be calculated by the following formula.

u=331.6+0.6*T (m/s), where T represents temperature in degrees Celsius, and 331.6 m/s is the speed of propagation of acoustic waves in air at a temperature of 0 degrees Celsius.

Figure 6:
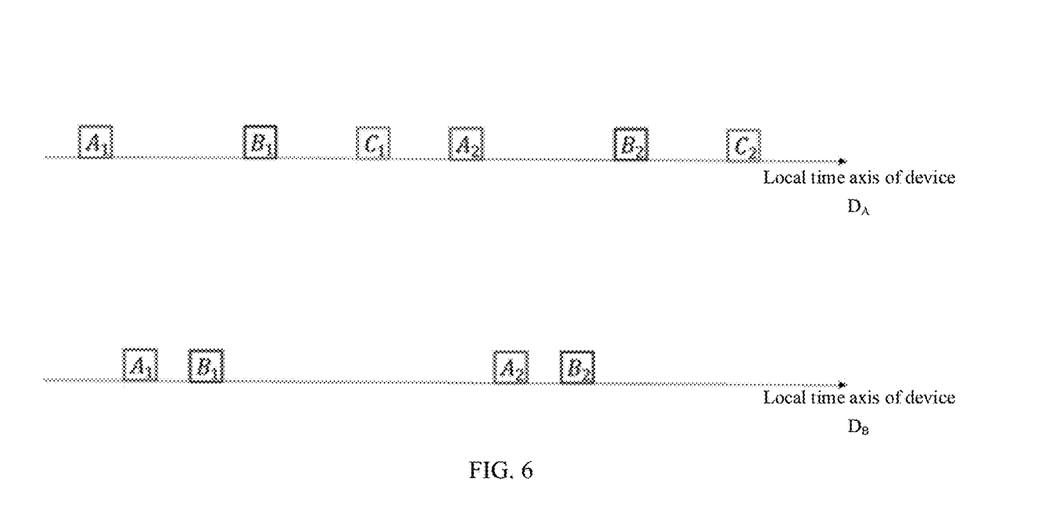
FIG. 6 is a time sequence schematic diagram of continuous distance measurement illustrated according to an embodiment.

FIG. 6 is a time sequence schematic diagram of continuous distance measurement illustrated according to an embodiment. In FIG. 6, $A_1$ represents detection signal A sent by device $D_A$ for the first time, $B_1$ represents detection signal B sent by device $D_B$ for the first time, and $C_1$ represents data encoding signal C sent by device $D_B$ for the first time. $A_2$ represents detection signal A sent by device $D_A$ for the second time, $B_2$ represents detection signal B sent by device $D_B$ for the second time, and $C_2$ represents data encoding signal C sent by device $D_B$ for the second time, and so on. The timing sequence of the detection signals and data encoding signals arriving at the local time axis of device $D_A$ and the timing sequence of the detection signals arriving at the local time axis of device $D_B$ during the continuous distance measurement process can be seen in FIG. 6. FIG. 6 is a general timing diagram for continuous distance measurement. This embodiment is illustrated by three consecutive distance measurements between device $D_A$ and device $D_B$ as an example, but is not limited to three consecutive distance measurements. Since there is a defect that the data encoding signal C (e.g., $C_1$) collides with the re-sent detection signal A (e.g., $A_2$), the distance measurement timing requires that the distance between the two devices be calculated after the completion of one distance measurement, i.e., after device $D_A$ detects the data encoding signal C, and then device $D_A$ sends the next detection signal A, so that the complete process of each distance measurement is independent in time to reduce the probability that the current distance measurement cannot be completed due to the collision between the data encoding signal C and the re-sent detection signal A.

Figure 7:
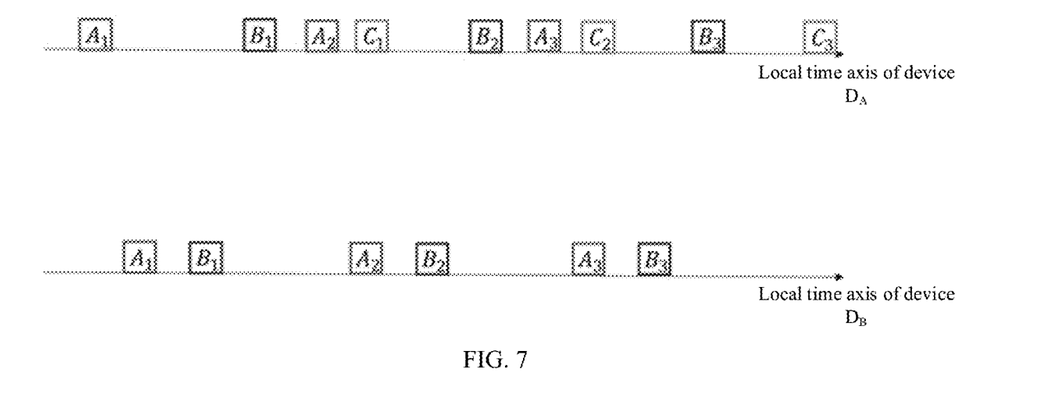
FIG. 7 is a time sequence schematic diagram of another continuous distance measurement illustrated according to an embodiment.

FIG. 7 is a time sequence schematic diagram of another continuous distance measurement illustrated according to an embodiment. As shown in FIG. 7, during the continuous distance measurement process, device $D_A$ sends detection signal $A_2$ after receiving detection signal $B_1$ from device $D_B$, which enables two adjacent measurements to be made without affecting each other, thus effectively increasing the range frequency. That is, device $D_A$, regardless of the moment of arrival of data encoding signal C, simply determines whether detection signal B is detected, and sends detection signal A again if detection signal B is detected.

In some embodiments, there is still a probability that the re-sent detection signal A will collide with the data encoding signal in the case that device $D_A$ sends detection signal A again after receiving detection signal B from device $D_B$, and the collision between the re-sent detection signal A and the data encoding signal will lead to two consecutive distance measurement failures. For example, as shown in FIG. 7, detection signal $A_2$ and data encoding signal $C_1$ may collide, resulting in failure of the first distance measurement and the second distance measurement.

In order to solve this problem, in one embodiment of the present disclosure, modulated signals with different carrier frequencies are designed for detection signal A, detection signal B, and data encoding signal C, respectively, and the three signals can be completely separated by band-pass filtering during the detection stage. This, on the one hand, solves the problem of temporal collision of detection signal A, detection signal B and data encoding signal C. Even if the collision occurs, the three signals can be detected normally after the band-pass filtering, which does not affect the detection accuracy and detection efficiency. On the other hand, the use of frequency division to completely separate the three different signals can also greatly reduce the false detection rate and improve the stability of the distance measurement process.

In this embodiment of the present disclosure, the first detection signal may be modulated and sent by the first device using a first carrier frequency, the second detection signal may be modulated and sent by the second device using a second carrier frequency, and the second time difference is characterized by a data encoding signal, which is modulated and sent by the second device using a third carrier frequency. The first carrier frequency, the second carrier frequency, and the third carrier frequency are different from each other.

The modulation of the first detection signal, the second detection signal and the data encoding signal using different carrier frequencies allows the first detection signal, the second detection signal and the data encoding signal not to collide with each other, thus avoiding the current distance measurement failure due to signal collision. Since the first detection signal, the second detection signal and the data encoding signal are modulated at different carrier frequencies at the sending end, the modulated first detection signal, the modulated second detection signal and the modulated data encoding signal are filtered at the receiving end using band-pass filters corresponding to respective carrier frequencies to obtain the corresponding first detection signal, the second detection signal and the data encoding signal. That is, the first device receives the modulated first detection signal, the modulated second detection signal, and the modulated data encoding signal in the following manner: receiving each of the modulated first detection signal, the modulated second detection signal, and the modulated data encoding signal via a band-pass filter.

In this embodiment, a more efficient distance measurement timing logic is designed to modulate the first detection signal, the second detection signal and the data encoding signal in the distance measurement process to different carrier frequencies by means of frequency division, avoiding the signal collision problem, which can increase the ranging frequency, reduce the signal false detection rate and improve the ranging accuracy. The solution is low cost, high accuracy and good reliability.

In this embodiment, the signal transmitter includes a signal generation unit, a digital-to-analog conversion (DAC) unit, and a signal sending unit. The signal generation unit modulates the detection signal at an agreed carrier frequency, and the modulation method used can be any of the existing modulation methods, such as Phase Shift Keying (PSK), Frequency Shift Keying (FSK) and Orthogonal Frequency Division Multiplexing (OFDM) without any specific limitation in this embodiment. The signal receiver includes a signal reception unit, an analog to digital conversion (ADC) unit, and an acoustic signal detection unit. The acoustic signal detection unit includes band-pass filters to filter the received modulated signals to separate the different signals.

Figure 8:
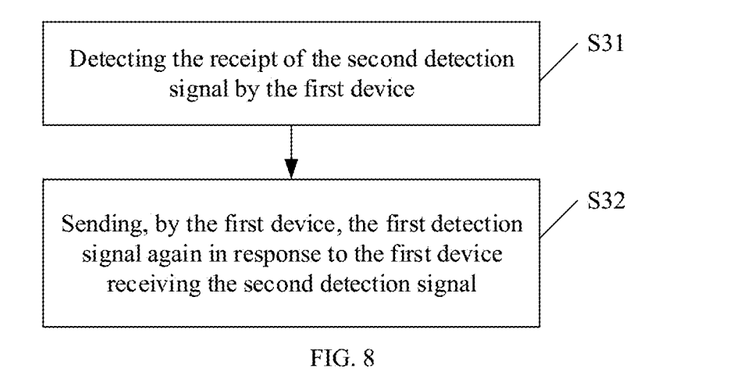
FIG. 8 is a flow chart of a method for measuring a distance illustrated according to an embodiment.

FIG. 8 is a flow chart of a method for measuring a distance illustrated according to an embodiment. As shown in FIG. 8, the method for measuring the distance includes the following steps.

At step S31, the first device detects the receipt of the second detection signal.

At step S32, the first device sends the first detection signal again in response to the first device receiving the second detection signal.

In this embodiment, in order to achieve continuous distance measurement, it is necessary to control the first device to send the next first detection signal immediately after detecting the second detection signal received by the first device. In this way, the ranging frequency can be improved to ensure that the distance between the first device and the second device is obtained in time. However, due to the influence of the resources of the first device, there is a delay between the instruction to send the first detection signal again, and the actual re-sending of the first detection signal, for example, there is a delay of 0.1 s between the first device issuing an instruction to send the first detection signal and the first device actually sending the first detection signal.

Figure 9:
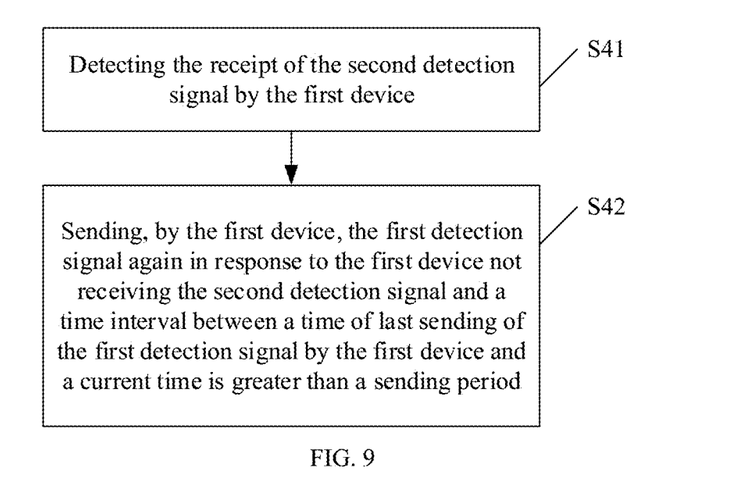
FIG. 9 is a flow chart of a method for measuring a distance illustrated according to an embodiment.

FIG. 9 is a flow chart of a method for measuring a distance illustrated according to an embodiment. As shown in FIG. 9, the method for measuring the distance includes the following steps.

At step S41, the first device detects the receipt of the second detection signal.

At step S42, the first device sends the first detection signal again in response to the first device not receiving the second detection signal and a time interval between a time of last sending of the first detection signal by the first device and a current time is greater than a sending period.

In this embodiment, the time of the $n^{th}$ (n is greater than or equal to 1) sending of the first detection signal is recorded in the first device and the timing starts. At a certain moment before the $(n+1)^{th}$ sending of the first detection signal for distance measurement by the first device, a time interval between the time of the $n^{th}$ sending of the first detection signal and this moment is obtained. If the obtained time interval is greater than a preset sending period and no second detection signal is detected by the first device, the first device sends the first detection signal for the $(n+1)^{th}$ time. Alternatively, if the obtained time interval does not reach the preset sending period and the detection signal is received by the first device, the first device sends the first detection signal for the $(n+1)^{th}$ time. In this way, the ranging frequency can be maximized, and the problem of no longer sending the distance measurement detection signals due to missed detection can be avoided.

In the method for measuring the distance described in this embodiment, the first detection signal may further be sent at a fixed sending period.

The sending period is set in the following way.

A maximum distance between the first device and the second device, and a time interval between the time when the first device issues the instruction to send the first detection signal and the time when the first device actually sends the first detection signal, are obtained; a maximum time difference for the first time difference is determined based on the maximum distance between the first device and the second device and the time interval; and a sending period greater than the maximum time difference is determined as the sending period.

In this embodiment, the sending period T can be predicted according to the actual application scenario. Assuming that the maximum distance to be measured is represented as $d_{max}$, the time interval between the first device issuing the sending instruction and the device actually sending the acoustic signal is represented as $t_d$, the first time difference $t_{max}$ for the first time difference (i.e., the time difference between signal $B_1$ and signal $A_1$ arriving at the signal receiving end of device $D_A$) can be obtained by the following formula.

$$t_{max} = 2 \cdot \frac{d_{max}}{u} + t_d,$$

where u represents the speed of propagation of the detection signal in the medium, e.g., the speed of sound is approximated as 340 m/s, $t_d$ may range from a few milliseconds to a few hundred milliseconds, and $d_{max}$ may be a few tens of centimeters, a few meters or any value. The setting for the sending period T needs to satisfy that $T > t_{max}$.

In one embodiment, the first device is represented as device $D_A$ and the second device is represented as device $D_B$. The method for measuring the distance in this embodiment includes device $D_A$ sending the detection signal multiple times. Device $D_A$ may send detection signal $A_2$ immediately after receiving detection signal $B_1$ from device $D_B$, or device $D_A$ may send the detection signal $A_2$ at a fixed period. In some embodiment, device $D_A$ may send detection signal $A_2$ immediately in response to receiving and detecting detection signal $B_1$, and/or device $D_A$ may send detection signal $A_2$ until the time interval from the last detection signal $A_1$ exceeds period T in response to no detection signal B being subsequently detected.

Figure 10:
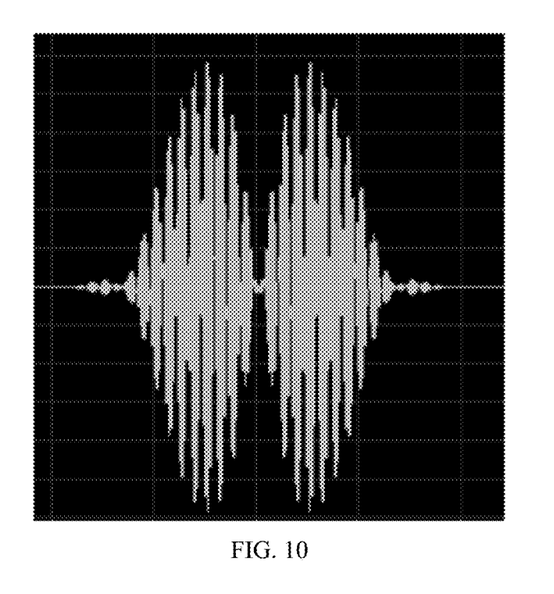
FIG. 10 is a schematic diagram of a detection signal waveform illustrated according to an embodiment.
Figure 11:
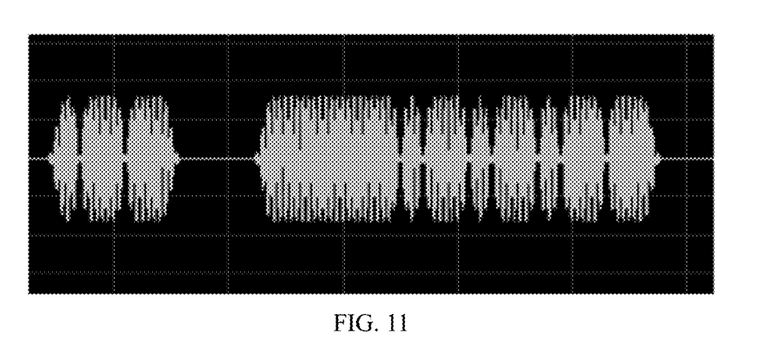
FIG. 11 is a schematic diagram of a data encoding signal waveform illustrated according to an embodiment.

The waveform of the detection signal may be, but not limited to, shown in FIG. 10. The waveform of the data encoding signal may be, by not limited to, shown in FIG. 11. The first sampling time and the second sampling time are determined by the waveform of detection signal A, and the first sampling time difference is determined based on the first sampling time and the second sampling time. The third sampling time and the fourth sampling time are determined by the waveform of detection signal B, and the second sampling time difference is determined based on the third sampling time and the fourth sampling time. The second device encodes the second sampling time difference to generate the data encoding signal and sends the data encoding signal to the first device. The first device determines the second sampling time difference by the waveform of the data encoding signal, and then determines the distance between the first device and the second device based on the first sampling time difference and the second sampling time difference.

The detection signal in these embodiments of the present disclosure can be any freely designed specific signal, and its arrival time can be detected by envelope detection, correlation detection or some other common signal detection methods, and the data coding signal can be generated by any coding modulation methods such as FSK, PSK, OFDM, etc. The decoding end performs detection with a corresponding decoding method to obtain the values used in the above distance calculation formulas, and then calculate the distance between devices.

Indoor positioning may be performed by the method for measuring the distance provided by these embodiments. For example, the sending end is an acoustic wave transmitter, such as a stereo, speaker, etc., placed at a fixed location indoors, and the receiving end is an IOT device, such as a sweeping robot. The position of the IOT device in the geometric space may be calculated by the IOT device receiving periodic signals from the signal transmitter.

Mobile payment may be performed by the method for measuring the distance provided by these embodiments. For example, the sending end is a cash register or other collection device, and the receiving end is a terminal with payment function, such as a cell phone. The sending end sends periodic signals, and the receiving end receives the periodic signals and calculates the distance between the receiving end and the sending end. When the distance is less than a set threshold range, the payment interface is woken up. Compared with the traditional scanning code payment scheme, there is no need to open the camera to scan the code, and the user only needs to bring the cell phone close to the payment device to automatically wake up the payment interface, which is more convenient to operate.

The wifi password sharing may be carried out by the method for measuring the distance provided by these embodiments. For example, both the sending end and the receiving end are cell phones. The sending end sends periodic acoustic wave signals, and the receiving end calculates the distance between the receiving end and the sending end after receiving the periodic acoustic wave signals. When the distance is less than a set threshold range, the password transmission and decoding, or other operations, are performed, which also saves the action of opening the camera to scan the code of the existing QR code scanning function, and may reduce power consumption and reduce misuse.

Speaker relay may be performed by the method for measuring the distance provided by these embodiments. For example, the sending end is a speaker device, and the receiving end is a cell phone. The sending end sends periodic acoustic signals, and the receiving end calculates the distance between the receiving end and the sending end after receiving the periodic acoustic signals. When the distance is less than a set threshold range, the interconnection communication between the cell phone and the speaker device is completed to achieve synchronous playback of multiple speaker devices, which can reduce the false call rate and misuse compared to the current Bluetooth speaker relay method.

Based on a same concept, embodiments of the present disclosure also provide an apparatus for measuring a distance.

It should be understood that the apparatus for measuring the distance, provided by embodiments of the present disclosure, contains hardware structures and/or software modules that perform the respective functions in order to achieve the aforementioned functions. In combination with the units and algorithmic steps of each example disclosed in embodiments of the present disclosure, embodiments of the present disclosure can be implemented in the form of hardware or a combination of hardware and computer software. Whether a particular function is performed as hardware or computer software driven hardware depends on the particular application and design constraints of the technical solution. A person skilled in the art may use a different approach for each particular application to implement the described functionality, but such implementation should not be considered outside the scope of the technical solutions of the embodiments of the present disclosure.

Figure 12:
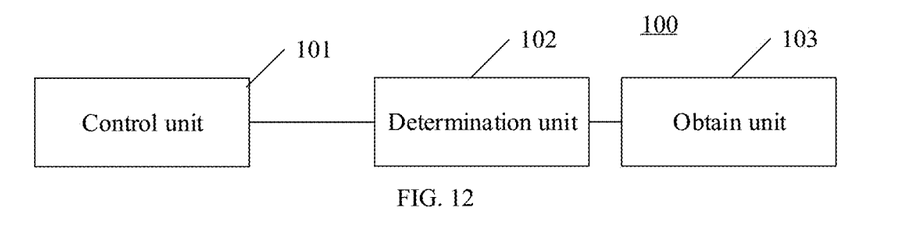
FIG. 12 is a block diagram of an apparatus for measuring a distance illustrated according to an embodiment.

FIG. 12 is a block diagram of an apparatus for measuring a distance illustrated according to an embodiment. With respect to FIG. 12, the apparatus 100 is applied to a first device, and includes: a control unit 101 configured to control the first device to send a first detection signal; a determination unit 102 configured to determine a first time difference, where the first time difference is a time difference between a time of receiving the first detection signal by the first device and a time of receiving a second detection signal by the first device, and the second detection signal is sent by a second device in response to the first detection signal after the second device receiving the first detection signal; and the obtain unit 103 configured to obtain a second time difference from the second device, where the second time difference is a time difference between a time of receiving the first detection signal by the second device and a time of receiving the second detection signal by the second device. The determination unit 102 is further configured to determine the distance between the first device and the second device based on the first time difference and the second time difference.

In one embodiment, the determination unit 102 is configured to obtain a first distance and a second distance, the first distance being a distance between a signal transmitter and a signal receiver of the first device, the second distance being a distance between a signal transmitter and a signal receiver of the second device; determine a TOF distance between the first device and the second device based on the first time difference and the second time difference; and determine a sum of the TOF distance, the first distance, and the second distance as the distance between the first device and the second device.

In one embodiment, the first time difference is a ratio between a first sampling time difference and a first sampling frequency, the first sampling time difference is a difference between a first sampling time and a second sampling time, the first sampling time is a sampling time of sampling the first detection signal by the first device using the first sampling frequency, and the second sampling time is a sampling time of sampling the section detection signal by the first device using the first sampling frequency; and the second time difference is a ratio between a second sampling time difference and a second sampling frequency, the second sampling time difference is a difference between a third sampling time and a fourth sampling time, the third sampling time is a sampling time of sampling the first detection signal by the second device using the second sampling frequency, and the fourth sampling time is a sampling time of sampling the second detection signal by the second device using the second sampling frequency.

In one embodiment, the first detection signal is modulated and sent by the first device using a first carrier frequency; the second detection signal is modulated and sent by the second device using a second carrier frequency; the second time difference is characterized by a data encoding signal, and the data encoding signal is modulated and sent by the second device using a third carrier frequency; and the first carrier frequency, the second carrier frequency, and the third carrier frequency are different from each other. The first device receives the modulated first detection signal, the modulated second detection signal, and the modulated data encoding signal by: receiving each of the modulated first detection signal, the modulated second detection signal, and the modulated data encoding signal via a band-pass filter.

In one embodiment, the control unit 101 is further configured to: control, in response to the first device receiving the second detection signal, the first device to send the first detection signal again; and/or control, in response to the first device not receiving the second detection signal and a time interval between a time of last sending of the first detection signal by the first device and a current time is greater than a sending period, the first device to send the first detection signal again.

In one embodiment, the control unit 101 is further configured to: send the first detection signal at a fixed sending period.

In one embodiment, the sending period is set by: obtaining a maximum distance between the first device and the second device, and a time interval between a time of issuing an instruction to send the first detection signal by the first device and a time of actually sending the first detection signal by the first device; determining a maximum time difference for the first time difference based on the maximum distance between the first device and the second device and the time interval; and setting the sending period greater than the maximum time difference.

In one embodiment, a relationship between the maximum distance between the first device and the second device, the time interval, and the maximum time difference satisfies following formula.

$$t_{max} = 2 \cdot \frac{d_{max}}{u} + t_d,$$

where $t_{max}$ represents the maximum time difference, $d_{max}$ represents the maximum distance between the first device and the second device, u represents a speed of propagation of a signal in a medium, and $t_d$ represents the time interval between the time of issuing the instruction to send the first detection signal by the first device and the time of actually sending the first detection signal by the first device.

Regarding the apparatus in the above embodiments, the specific way in which each module performs its operation has been described in detail in the embodiment concerning the method, and will not be described in detail here.

Figure 13:
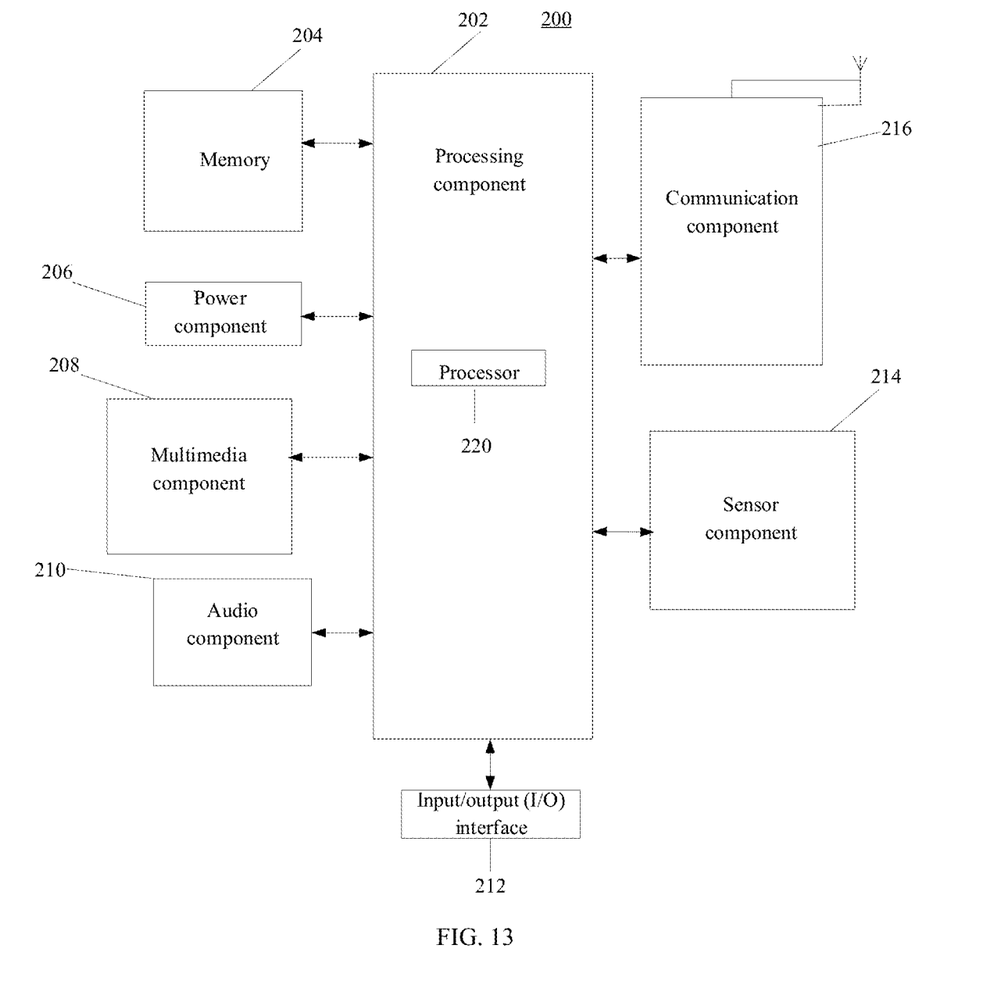
FIG. 13 is a block diagram of a device for measuring a distance illustrated according to an embodiment.

FIG. 13 is a schematic block diagram of a device 200 for measuring a distance illustrated according to the embodiments of the present disclosure. For example, the device 200 may be may be a cell phone, a computer, a digital broadcast terminal, a message sending and receiving device, a game console, a tablet device, a medical device, a fitness device, a personal digital assistant, and the like.

Referring to FIG. 13, the device 200 may include one or more of the following components: a processing component 202, a memory 204, a power component 206, a multimedia component 208, an audio component 210, an input/output (I/O) interface 212, a sensor component 214, and a communication component 216.

The processing component 202 typically controls the overall operation of the device 200, such as operations associated with display, phone call, data communication, camera operation, and recording operations. The processing component 202 may include one or more processors 220 to execute instructions to complete all or some of the steps of the method described above. In addition, the processing component 202 may include one or more modules that facilitate interaction between processing component 202 and other components. For example, processing component 202 may include a multimedia module to facilitate interaction between multimedia component 208 and processing component 202.

The memory 204 is configured to store various types of data to support operation at the electronic device 200. Examples of such data include instructions for any application or method of operation on the device 200, contact data, phonebook data, messages, images, videos, etc. The memory 204 can be implemented by any type of transitory or non-transitory storage device or a combination of them, such as static random access memory (SRAM), electrically erasable programmable read-only memory (EEPROM), erasable programmable read-only memory (EPROM), programmable read-only memory (PROM), read-only memory (ROM), magnetic memory, flash memory, disk or CD.

The power component 206 provides power to the various components of the device 200. The power component 206 may include a power management system, one or more power supplies, and other components associated with generating, managing, and distributing power for the device 200.

The multimedia component 208 includes a screen providing an output interface between the device 200 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense the boundaries of the touch or swipe action, but also detect the duration and pressure associated with the touch or swipe action. In some embodiments, the multimedia component 208 includes a front-facing camera and/or a rear-facing camera. The front camera and/or rear camera can receive external multimedia data when the device 200 is in an operating mode, such as shooting mode or video mode. Each front camera and rear camera may be a fixed optical lens system or have focal length and optical zoom capability.

The audio component 210 is configured to output and/or input audio signals. For example, the audio component 210 includes a microphone (MIC) configured to receive external audio signals when the device 200 is in an operating mode, such as call mode, recording mode, and voice recognition mode. The received audio signal may be further stored in memory 204 or sent via communication component 216. In some embodiments, the audio component 210 further includes a speaker for outputting audio signals.

The I/O interface 212 provides an interface between the processing component 202 and a peripheral interface module, the peripheral interface module may be a keyboard, click wheel, button, etc. These buttons may include, but are not limited to: a home button, a volume button, a start button, and a lock button.

The sensor component 214 includes one or more sensors for providing status assessment of various aspects of the device 200. For example, the sensor component 214 may detect an open/closed state of the device 200, the relative positioning of components, such as the components being the display and keypad of the device 200, the sensor component 214 may also detect a change in position of the device 200 or a component of the device 200, the presence or absence of user contact with the device 200, the orientation or acceleration/deceleration of the device 200 and temperature changes of the device 200. The sensor component 214 may include a proximity sensor configured to detect the presence of a nearby object in the absence of any physical contact. The sensor component 214 may also include a light sensor, such as a CMOS or CCD image sensor, for use in imaging applications. In some embodiments, the sensor component 214 may also include an accelerometer sensor, a gyroscope sensor, a magnetic sensor, a pressure sensor, or a temperature sensor.

The communication component 216 is configured to facilitate communication between the device 200 and other devices by wired or wireless means. The device 200 may access a wireless network based on a communication standard, such as WiFi, 2G, 3G, 4G, 5G, or a combination thereof. In one embodiment, communication component 216 receives broadcast signals or broadcast-related information from an external broadcast management system via a broadcast channel. In an embodiment, the communication component 216 further includes a near-field communication (NFC) module to facilitate short-range communication. For example, the NFC module may be implemented based on radio frequency identification (RFID) technology, infrared data association (IrDA) technology, ultra-wideband (UWB) technology, Bluetooth (BT) technology, and other technologies.

In some embodiments, the device 200 may be implemented by one or more application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic components for performing above mentioned method for measuring the distance.

In some embodiments, there is also provided a non-transitory computer readable storage medium including instructions, such as a memory 204 including instructions, the instructions being executable by the processor 220 of the device 200 to accomplish the method described above. For example, said non-transitory computer readable storage medium may be ROM, random access memory (RAM), CD-ROM, magnetic tape, floppy disk, and optical data storage devices, among others.

By the above embodiments provided in this application, the distance between the first device and the second device is determined based on the first time difference and the second time difference, where the first time difference is between the time of receiving the first detection signal by the first device and the time of receiving the second detection signal by the first device, and the second time difference is between the time of receiving the first detection signal by the second device and the time of receiving the second detection signal by the second device, compared to, for example, determining the distance between the first device and the second device based on the time difference between the time of sending the first detection signal by the first device and the time of receiving the second detection signal by the first device and the time difference between the time of sending the second detection signal by the second device and the time of receiving the first detection signal by the second device, avoiding the effect on the flight time due to the time difference between issuing the instruction to send the detection signal by the first device/second device and actually sending the detection signal by the first/second device, and improves the accuracy of distance measurement between devices.

It should be understood that the term "plurality" in this disclosure refers to two or more, and other quantifiers are similar. The word "and/or" describes a relationship between the associated objects, indicating that three relationships can exist, for example, A and/or B, which can indicate the existence of A alone, A and B together, and B alone. The character "/" generally indicates the object before the character is in an "or" relationship with the object after the character. The singular forms "a", "said" and "the" are also intended to include most forms, unless the context clearly indicates otherwise.

It should be further understood that the terms "first", "second", etc. are used to describe various types of information, but that such information should not be limited to these terms. These terms are used only to distinguish information of the same type from one another and do not indicate a particular order or level of importance. In fact, the expressions "first" and "second" can be used interchangeably. For example, without departing from the scope of this disclosure, first information may also be referred to as second information, and similarly, second information may also be referred to as first information.

It should be further understood that, unless otherwise specified, the term "connect" includes a direct connection between the two components where no other component is present, and an indirect connection between the two components where other components are present.

It should be further understood that although the operations are shown in the accompanying drawings in a particular order in the embodiments of the present disclosure, this should not be construed as requiring that the operations be performed in the particular order shown or in serial order, or that all of the operations shown be performed to obtain the desired results. Multitasking and parallel processing may be advantageous in particular environments.

Other embodiments of the present disclosure will be readily anticipated by those skilled in the art upon consideration of the specification and practice of the invention disclosed herein. This application is intended to cover any variation, use, or adaptation of the present disclosure that follows the general principles of the present disclosure and includes commonly known or customary technical means in the art that are not disclosed herein. The description and embodiments are intended to be exemplary only, and the true scope and spirit of the present disclosure is indicated by the following scope of claims.

It should be understood that the present disclosure is not limited to the precise structure already described above and illustrated in the accompanying drawings, and that various modifications and changes may be made without departing from its scope. The scope of the present disclosure is limited only by the scope of the appended claims.

What is claimed is:

1. A method for measuring a distance, applied to a first device, comprising:
   sending a first detection signal;
   determining a time difference, between a time of receiving the first detection signal by the first device and a time of receiving a second detection signal by the first device, as a first time difference, wherein the second detection signal is sent by a second device in response to the second device receiving the first detection signal;

obtaining a second time difference from the second device, the second time difference being a time difference between a time of receiving the first detection signal by the second device and a time of receiving the second detection signal by the second device; and determining the distance between the first device and the second device based on the first time difference and the second time difference;

wherein the first detection signal is modulated and sent by the first device using a first carrier frequency; the second detection signal is modulated and sent by the second device using a second carrier frequency; the second time difference is characterized by a data encoding signal, and the data encoding signal is modulated and sent by the second device using a third carrier frequency; and the first carrier frequency, the second carrier frequency, and the third carrier frequency are different from each other; and wherein the method further comprises:

receiving each of the modulated first detection signal, the modulated second detection signal, and the modulated data encoding signal via a band-pass filter.

2. The method for measuring the distance of claim 1, wherein determining the distance between the first device and the second device further comprises:

obtaining a first distance and a second distance, the first distance being a distance between a signal transmitter and a signal receiver of the first device, the second distance being a distance between a signal transmitter and a signal receiver of the second device;

determining a Time Of Flight (TOF) distance between the first device and the second device based on the first time difference and the second time difference; and determining a sum of the TOF distance, the first distance, and the second distance as the distance between the first device and the second device.

3. The method for measuring the distance of claim 1, wherein:

the first time difference is a ratio between a first sampling time difference and a first sampling frequency, the first sampling time difference is a difference between a first sampling time and a second sampling time, the first sampling time is a sampling time of sampling the first detection signal by the first device using the first sampling frequency, and the second sampling time is a sampling time of sampling the section detection signal by the first device using the first sampling frequency; and the second time difference is a ratio between a second sampling time difference and a second sampling frequency, the second sampling time difference is a difference between a third sampling time and a fourth sampling time, the third sampling time is a sampling time of sampling the first detection signal by the second device using the second sampling frequency, and the fourth sampling time is a sampling time of sampling the second detection signal by the second device using the second sampling frequency.

4. The method for measuring the distance of claim 2, wherein:

the first time difference is a ratio between a first sampling time difference and a first sampling frequency, the first sampling time difference is a difference between a first sampling time and a second sampling time, the first sampling time is a sampling time of sampling the first detection signal by the first device using the first sampling frequency, and the second sampling time is a sampling time of sampling the section detection signal by the first device using the first sampling frequency; and the second time difference is a ratio between a second sampling time difference and a second sampling frequency, the second sampling time difference is a difference between a third sampling time and a fourth sampling time, the third sampling time is a sampling time of sampling the first detection signal by the second device using the second sampling frequency, and the fourth sampling time is a sampling time of sampling the second detection signal by the second device using the second sampling frequency.

5. The method for measuring the distance of claim 1, further comprising:

sending again, in response to the first device receiving the second detection signal, the first detection signal; and/or sending again, in response to the first device not receiving the second detection signal and a first time interval between a time of last sending of the first detection signal by the first device and a current time is greater than a sending period, the first detection signal.

6. The method for measuring the distance of claim 1, wherein sending the first detection signal comprises:

sending the first detection signal at a fixed sending period.

7. The method for measuring the distance of claim 6, wherein the fixed sending period is determined by:

obtaining a maximum distance between the first device and the second device, and a second time interval between a time of issuing an instruction to send the first detection signal by the first device and a time of actually sending the first detection signal by the first device;

determining a maximum time difference for the first time difference based on the maximum distance between the first device and the second device and the second time interval; and determining a sending period greater than the maximum time difference as the fixed sending period.

8. The method for measuring the distance of claim 7, wherein a relationship between the maximum distance between the first device and the second device, the second time interval, and the maximum time difference satisfies following formula:

$$t_{max} = 2 \cdot \frac{d_{max}}{u} + t_d;$$

wherein $t_{max}$ represents the maximum time difference, $d_{max}$ represents the maximum distance between the first device and the second device, u represents a speed of propagation of a signal in a medium, and $t_d$ represents the second time interval.

9. The method for measuring the distance of claim 1, wherein sending the first detection signal comprises: sending the first detection signal at a fixed sending period; and wherein the method further comprises:

sending again, in response to the first device not receiving the second detection signal and a first time interval between a time of last sending of the first detection signal by the first device and a current time is greater than the fixed sending period, the first detection signal; and wherein the fixed sending period is determined by:

obtaining a maximum distance between the first device and the second device, and a second time interval between a time of issuing an instruction to send the first detection signal by the first device and a time of actually sending the first detection signal by the first device;

determining a maximum time difference for the first time difference based on the maximum distance between the first device and the second device and the second time interval; and determining a sending period greater than the maximum time difference as the fixed sending period.

10. The method for measuring the distance of claim 1, wherein sending the first detection signal comprises: sending the first detection signal at a fixed sending period; and wherein the method further comprises:

sending again, in response to the first device not receiving the second detection signal and a first time interval between a time of last sending of the first detection signal by the first device and a current time is greater than the fixed sending period, the first detection signal; and wherein the fixed sending period is determined by:

obtaining a maximum distance between the first device and the second device, and a second time interval between a time of issuing an instruction to send the first detection signal by the first device and a time of actually sending the first detection signal by the first device;

determining a maximum time difference for the first time difference based on the maximum distance between the first device and the second device and the second time interval; and determining a sending period greater than the maximum time difference as the fixed sending period; and wherein a relationship between the maximum distance between the first device and the second device, the second time interval, and the maximum time difference satisfies following formula:

$$t_{max} = 2 \cdot \frac{d_{max}}{u} + t_d;$$

wherein $t_{max}$ represents the maximum time difference, $d_{max}$ represents the maximum distance between the first device and the second device, u represents a speed of propagation of a signal in a medium, and $t_d$ represents the second time interval.

11. A first device for measuring a distance, comprising:
a processor, and
a memory storing one or more executable instructions for the processor, wherein
the processor is configured to:
send a first detection signal;
determine a time difference, between a time of receiving the first detection signal by the first device and a time of receiving a second detection signal by the first device, as a first time difference, wherein the second detection signal is sent by a second device in response to the second device receiving the first detection signal;

obtain a second time difference from the second device, the second time difference being a time difference between a time of receiving the first detection signal by the second device and a time of receiving the second detection signal by the second device; and determine the distance between the first device and the second device based on the first time difference and the second time difference;

wherein the first detection signal is modulated and sent by the first device using a first carrier frequency; the second detection signal is modulated and sent by the second device using a second carrier frequency; the second time difference is characterized by a data encoding signal, and the data encoding signal is modulated and sent by the second device using a third carrier frequency; and the first carrier frequency, the second carrier frequency, and the third carrier frequency are different from each other; and wherein the processor is further configured to receive each of the modulated first detection signal, the modulated second detection signal, and the modulated data encoding signal via a band-pass filter.

12. The device for measuring the distance of claim 11, wherein the processor is further configured to:

obtain a first distance and a second distance, the first distance being a distance between a signal transmitter and a signal receiver of the first device, the second distance being a distance between a signal transmitter and a signal receiver of the second device;

determine a Time Of Flight (TOF) distance between the first device and the second device based on the first time difference and the second time difference; and determine a sum of the TOF distance, the first distance, and the second distance as the distance between the first device and the second device.

13. The device for measuring the distance of claim 12, wherein:

the first time difference is a ratio between a first sampling time difference and a first sampling frequency, the first sampling time difference is a difference between a first sampling time and a second sampling time, the first sampling time is a sampling time of sampling the first detection signal by the first device using the first sampling frequency, and the second sampling time is a sampling time of sampling the section detection signal by the first device using the first sampling frequency; and the second time difference is a ratio between a second sampling time difference and a second sampling frequency, the second sampling time difference is a difference between a third sampling time and a fourth sampling time, the third sampling time is a sampling time of sampling the first detection signal by the second device using the second sampling frequency, and the fourth sampling time is a sampling time of sampling the second detection signal by the second device using the second sampling frequency.

14. The device for measuring the distance of claim 11, wherein the first time difference is a ratio between a first sampling time difference and a first sampling frequency, the first sampling time difference is a difference between a first sampling time and a second sampling time, the first sampling time is a sampling time of sampling the first detection signal by the first device using the first sampling frequency, and the second sampling time is a sampling time of sampling the section detection signal by the first device using the first sampling frequency; and the second time difference is a ratio between a second sampling time difference and a second sampling frequency, the second sampling time difference is a difference between a third sampling time and a fourth sampling time, the third sampling time is a sampling time of sampling the first detection signal by the second device using the second sampling frequency, and the fourth sampling time is a sampling time of sampling the second detection signal by the second device using the second sampling frequency.

15. The device for measuring the distance of claim 11, wherein the processor is further configured to:

send again, in response to the first device receiving the second detection signal, the first detection signal; and/or send again, in response to the first device not receiving the second detection signal and a first time interval between a time of last sending of the first detection signal by the first device and a current time is greater than a sending period, the first detection signal.

16. The device for measuring the distance of claim 11, wherein the processor is further configured to:

send the first detection signal at a fixed sending period.

17. The device for measuring the distance of claim 16, wherein the processor is further configured to determine the fixed sending period by:

obtaining a maximum distance between the first device and the second device, and a second time interval between a time of issuing an instruction to send the first detection signal by the first device and a time of actually sending the first detection signal by the first device;

determining a maximum time difference for the first time difference based on the maximum distance between the first device and the second device and the second time interval; and determining a sending period greater than the maximum time difference as the fixed sending period.

18. The device for measuring the distance of claim 17, wherein a relationship between the maximum distance between the first device and the second device, the second time interval, and the maximum time difference satisfies following formula:

$$t_{max} = 2 \cdot \frac{d_{max}}{u} + t_d;$$

wherein $t_{max}$ represents the maximum time difference, $d_{max}$ represents the maximum distance between the first device and the second device, u represents a speed of propagation of a signal in a medium, and $t_d$ represents the second time interval.

19. A non-transitory computer readable storage medium, wherein one or more instructions in the storage medium, when executed by a processor of a first device, enable the first device to perform following acts:

sending a first detection signal;

determining a time difference, between a time of receiving the first detection signal by the first device and a time of receiving a second detection signal by the first device, as a first time difference, wherein the second detection signal is sent by a second device in response to the second device receiving the first detection signal;

obtaining a second time difference from the second device, the second time difference being a time difference between a time of receiving the first detection signal by the second device and a time of receiving the second detection signal by the second device; and determining the distance between the first device and the second device based on the first time difference and the second time difference;

wherein the first detection signal is modulated and sent by the first device using a first carrier frequency; the second detection signal is modulated and sent by the second device using a second carrier frequency; the second time difference is characterized by a data encoding signal, and the data encoding signal is modulated and sent by the second device using a third carrier frequency; and the first carrier frequency, the second carrier frequency, and the third carrier frequency are different from each other; and wherein the first device is enabled to further perform following acts:

receiving each of the modulated first detection signal, the modulated second detection signal, and the modulated data encoding signal via a band-pass filter;

wherein the first device is a mobile terminal.

20. The non-transitory computer readable storage medium of claim 19, wherein the one or more instructions in the storage medium, when executed by the processor of the first device, enable the first device to further perform following acts:

obtaining a first distance and a second distance, the first distance being a distance between a signal transmitter and a signal receiver of the first device, the second distance being a distance between a signal transmitter and a signal receiver of the second device;

determining a Time Of Flight (TOF) distance between the first device and the second device based on the first time difference and the second time difference; and determining a sum of the TOF distance, the first distance, and the second distance as the distance between the first device and the second device.

* * * * *